H. VIERTEL.
ELECTRODE FOR SEARCH LIGHTS.
APPLICATION FILED OCT. 25, 1907.
917,200.
Patented Apr. 6, 1909.
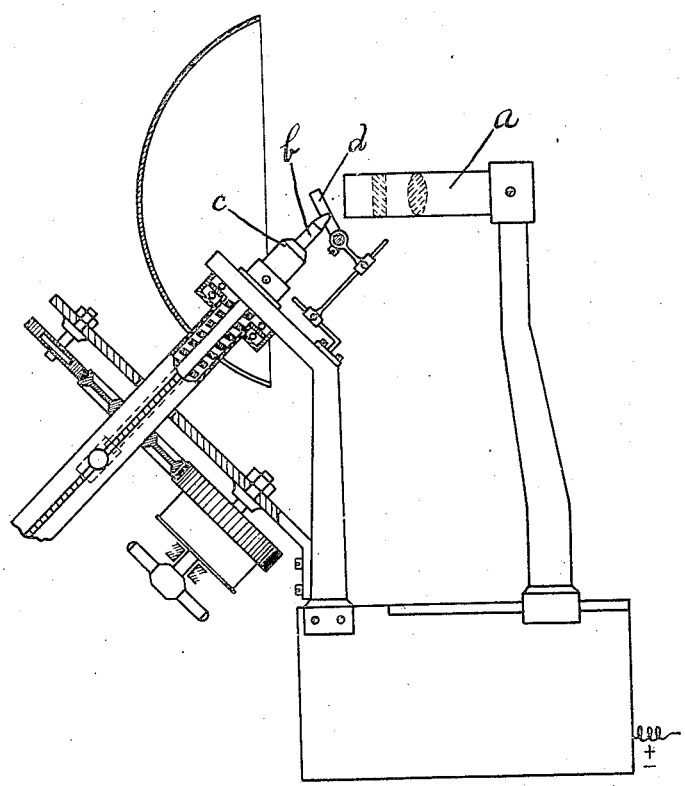

UNITED STATES PATENT OFFICE.

HERMANN VIERTEL, OF CHARLOTTENBURG, GERMANY, ASSIGNOR TO GEBR. SIEMENS & CO., OF LICHTENBERG, NEAR BERLIN, GERMANY, A COPARTNERSHIP.

ELECTRODE FOR SEARCH-LIGHTS.

No. 917,200.      Specification of Letters Patent.      Patented April 6, 1909.

Application filed October 25, 1907. Serial No. 399,082.

*To all whom it may concern:*

Be it known that I, HERMANN VIERTEL, a subject of the German Emperor, and resident at Knesebeckstrasse 32, Charlottenburg, near Berlin, Germany, have invented new and useful Improvements in Electrodes for Search-Lights, of which the following is a specification.

The present invention relates to search-lights, projectors and the like, and an important object is an improved arrangement of the electrodes in the same.

In accordance with the present invention the electrodes of arc-lamps for search-lights are arranged in such a manner that the electrodes are convergent, and the cross-section of the positive electrode is so proportioned that a burning surface is formed of approximately oval or rectangular shape which is as closely as possible adapted to the size and shape of the illuminating spot in the selected combination of electrodes. In this arrangement a burning surface is formed which is almost perfectly flat, and neither a disturbing edge of a crater is formed, nor is the burning surface hollowed out in the direction of the plane which passes through the axes of the two carbons which defects arise when positive carbons of circular cross-section having a more or less inclined position with regard to the negative carbon are employed. Consequently a much more favorable distribution of light and much more perfect utilization of the light is obtained.

In order that the carbons may burn away uniformly and quietly and in order that the illuminating spot may have an invariable position on the positive electrode, it is preferable to make the negative electrode of substantially smaller cross-sectional area than the positive electrode. It is best when the negative electrode is surrounded near the arc by a tube of carbon or other suitable electrically conducting material, and when it can be displaced in this tube.

The shape of the cross-section of the positive electrode is partially dependent on the amount of the inclination of the two electrodes to one another. Generally speaking the shape of the positive electrodes will be approximately oval or rectangular, as the illuminating spot approaches this shape when the electrodes are arranged in accordance with the present invention, and the burning surface of the electrode has to correspond with the illuminating spot.

The most favorable arrangement of the electrodes is such that the positive electrode having an oval cross-section is arranged in the axis of the search-light, whereas the negative electrode forms an angle of more than 90° with the positive; this angle is determined by trial and is found when the burning surface on the positive electrode approximately forms a plane at right-angles to the axis of the search-light. In this arrangement the cross-section of the positive electrode must approximately correspond directly to the shape of the illuminating spot.

In order to avoid changes of position of the illuminating spot on the carbon, which is of particular importance in this arrangement, because every change of position may mean a loss of light and a non-uniform utilization of the carbons, it is preferable to assure the steadiness of the arc and the uniformity of the position, shape and size of the illuminating spot by a blast-magnet. For this it is sufficient to provide an iron ring, which is magnetized by the current, encircling the arc or the points of the carbons.

In order that the invention may be clearly understood reference is made to the accompanying drawing in which a search-light is represented in sectional elevation, the carbons being arranged in accordance with the invention.

In the drawing *a* indicates the positive carbon which for example may have an oval or rectangular cross-section, as is represented by the hatched sections in the drawing; *b* indicates the negative carbon arranged inclined at an angle to the positive carbon and formed as a thinner rod which can be displaced in an axial direction in a casing *c* of conducting material. Both carbons are carried by holders which are preferably adjustable both by hand as well as by a mechanical or electrical device. The positive carbon is situated in the axis of the optical system.

*d* is a universally adjustable iron ring which acts as a blast-magnet, and is preferably supported on the negative carbon holder. By means of this ring the arc can be adjusted in position. This ring is preferably open above the arc, on account of the heat which would otherwise melt it at this point.

What I claim as my invention and desire to secure by Letters Patent is:—

1. In a search-light, the combination of a carbon-holder, a positive electrode having a cross-section with a larger and smaller axis carried by said holder, another carbon-holder, and a negative electrode carried by the latter and directed from below toward and at an oblique angle to the positive electrode, said larger axis of the cross-section of the positive electrode being situated in the plane of the two electrodes, for the purpose of adapting the cross-section of the positive electrode to the shape of the illuminating surface of the crater and of avoiding disturbing edges of the crater.

2. In a search-light, the combination of a carbon-holder, a positive electrode having an oval cross-section carried by said holder, another carbon-holder, and a negative electrode carried by the latter and directed from below toward and at an oblique angle to the positive electrode, said larger axis of the cross-section of the positive electrode being situated in the plane of the two electrodes, substantially as described.

3. In a search-light, the combination of a carbon-holder, a positive electrode having a cross-section with a larger and smaller axis carried by said holder, another carbon-holder, and a negative electrode carried by the latter and directed from below toward and at an oblique angle to the positive electrode, said larger axis of the cross section of the positive electrode being situated in the plane of the two electrodes, a blast-magnet adapted to regulate an arc between the electrodes, and means for adjusting universally the position of said magnet, for the purpose of assuring the required uniformity of the position, shape and size of the illuminating spot on the positive electrode.

4. In a search-light, the combination of a carbon-holder, a positive electrode having a cross-section with a larger and smaller axis carried by said holder, another carbon-holder, and a negative electrode carried by the latter and directed from below toward and at an oblique angle to the positive electrode, said larger axis of the cross-section of the positive electrode being situated in the plane of the two electrodes, and an iron ring encircling the negative electrode, and means for universally adjusting the position of said ring, as and for the purpose specified.

In testimony whereof I have signed my name to this specification in the presence of two witnesses.

HERMANN VIERTEL.

Witnesses:
 WOLDEMAR HAUPT.
 HENRY HASPER.